United States Patent [19]
Beneteau

[11] 3,828,652
[45] Aug. 13, 1974

[54] BACK-UP LOCKING CYLINDER

[76] Inventor: Donald J. Beneteau, 1333 Front St., Amherstburg, Ontario, Canada

[22] Filed: Dec. 15, 1972

[21] Appl. No.: 315,686

[52] U.S. Cl. .................................. 91/445, 91/461
[51] Int. Cl. ............................................ F15b 11/08
[58] Field of Search ........ 60/569, 568; 91/445, 461; 92/28

[56] References Cited
UNITED STATES PATENTS

| | | | |
|---|---|---|---|
| 2,490,823 | 12/1949 | Manning | 91/445 |
| 2,582,030 | 1/1952 | Halward | 91/445 |
| 2,893,206 | 7/1959 | Gelb | 60/569 |

FOREIGN PATENTS OR APPLICATIONS

| | | | |
|---|---|---|---|
| 657,970 | 10/1965 | Japan | 92/28 |

Primary Examiner—Irwin C. Cohen
Assistant Examiner—A. M. Zupcic
Attorney, Agent, or Firm—Charles Krassov

[57] ABSTRACT

A compressed air or hydraulic fluid cylinder for attaching a back-up electrode in resistance welding operation containing two pistons with corresponding piston rods. Compressed air entering through a port in the cylinder holds the two pistons in the normal inactive position. When the pistons are activated, pressurized non compressible fluid acts upon the front piston and extends its piston rod until contact is made with the welding work. The pressure at the welding point is maintained by means of the rear piston which is activated by compressed air to lock the existing pressure against the front cylinder. For recycling the procedure is repeated.

2 Claims, 2 Drawing Figures

PATENTED AUG 13 1974 3,828,652
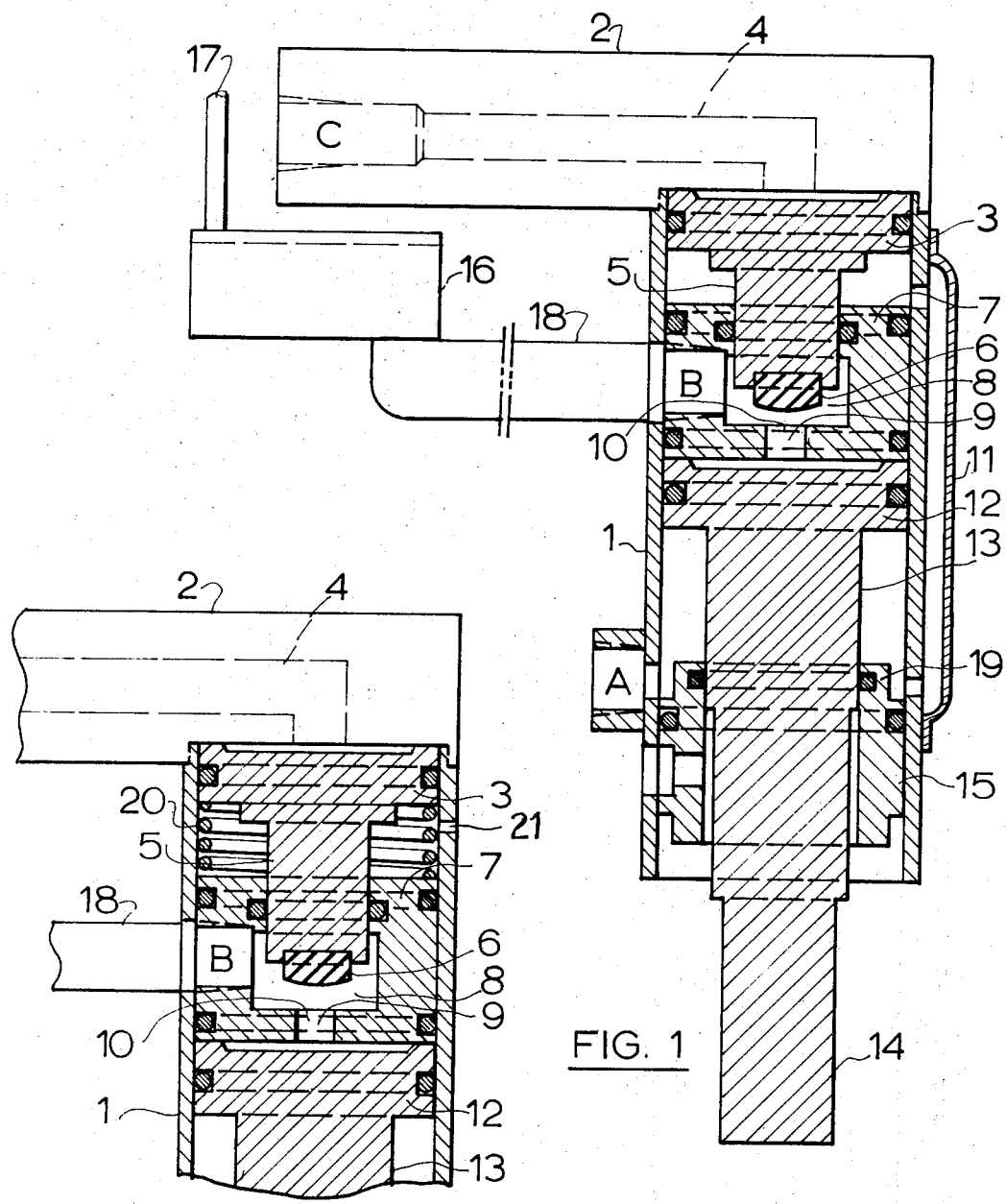
FIG. 1
FIG. 2
INVENTOR
DONALD J. BENETEAU
ATTORNEY

BACK-UP LOCKING CYLINDER

This invention consists of a cylinder for attaching a back-up electrode thereto in the process of resistance welding.

There are three primary factors involved in resistance welding, namely, electrical current, weld time, and pressure. The electrical current and the weld time are easily controllable by modern electronic methods, however, there are no positive means for pressure control. When two or more metal thicknesses are being welded together, it is very essential to maintain a constantly uniform pressure at the fusion point. This is difficult to do because no two metal stampings are precisely alike even if made by the same die. Also, some of the pressure of the applied electrodes, where fixed solid back-up electrodes are used, is used up in making the material to conform in shape to the back-up electrode. This tends to destroy the very essential uniformity thereby causing a large percentage of defective units which are either discarded or, if used, result in faulty products, either case constituting a considerable loss to the manufacturer. This situation is even more pronounced in the welding of irregular surfaced or non-uniform stampings.

The object of this invention is to provide means by which these deficiences can be compensated for. Particularly in resistance welding, it is the object of this invention to compensate for welding difficulties caused by electrode wear, and difficulties encountered in the welding of irregular and non-uniform stampings; and to eliminate the necessity of spotting back-up electrodes.

Another object of this invention is to reduce maintenance costs of resistance welding equipment by increasing the serviceable life of the electrodes which deteriate rapidly when used under improper pressure conditions.

In describing the invention reference will be made to the attached drawing in which:-

FIG. 1 is a diagrammatic view of the invention in section, and

FIG. 2 is a similar section showing a variation in the invention.

In the drawing is shown a cylinder 1 provided with a mounting base 2. A locking piston 3 is contained in the rear of the said cylinder, and pressure is provided to it by air or hydraulic fluid through the part C and passage way 4 located in the said mounting base.

The piston 3 is provided with a piston rod 5 the front of which contains a rubber sealing washer 6. The piston rod 5 slides within a fixed separator block 7 which has a central chamber 8. This chamber is provided with an entry port B and an exit port 9. The port 9 has a seat 10.

In the front of the cylinder 1 is a front piston 12 having a piston rod 13 which terminates in an adapter 14 to which a back-up electrode is attached. The piston rod 13 slides within the front piston guide 15.

The entry port B is connected by means of a pipe 18 which feeds a non-compressible fluid to the chamber 8 from a fluid container 16 to the upper part of which pressure is applied to the non-compressed fluid through an entry 17.

The cylinder 1 is also provided with an entry port A and a manifold 11, and all air or hydraulic fluid tight parts, whether fixed or movable are provided with sealing rings 19.

The variation shown in FIG. 2 shows a cylinder similar to the one shown in FIG. 1, however, the manifold 11 has been removed, and a spring 20 has been inserted between the piston 3 and the fixed separator block 7. This variation in the invention can be used where a lower pressure would be sufficient to provide proper back-up requirements. In this case an exhaust port 21 is provided in the space occupied by the spring 20.

The operation of the cylinder can be described as follows:-

By the use of a 4-way valve, the cylinder is in a normal position by pressurizing the port A with compressed air or hydraulic fluid. This pressure acts on the front of the piston 12 and on the front of the piston 3 through the manifold 11, and forces the said pistons as far back as they will go.

When the 4-way valve (not shown in the drawing) is cycled, the pressure at port A is released and a pressure is applied to port B by the pressurized non-compressible fluid in the container 16. This advances the piston 12 with its rod 13 and whatever electrode may be attached to the adapter 14 until contact is made. Then, port C applies pressure to the locking piston 3 so that its rod 5 with the sealing washer 6 shuts off the exit port 9 by pressing on the seat 10. This prevents the front piston 12 from backing up, and it is therefore locked in position. To recycle the cylinder, the pressure is released from ports B and C, and pressure is again applied to port A. The above contact and locking procedure is then repeated.

The pressure exerted on the work is dependent on the pressure in PSI at the port B times the area of the piston rod 13. This would usually be counteracted on the work by the clamps which are normally holding the parts to be welded together prior to welding. A 3-way normally closed air or hydraulic fluid valve is then cycled by a pressure sensing device sensing the pressure at port B or a delay device. By making the port 9 small in area as compared to the area of the locking piston 3, the seal 6 effectively locks the cylinder in any position as long as opposing pressure is insufficient to release the seal.

By way of example, in the welding of 0.030 inch CRS material the pressure required would be about 400 Lbs. electrode force, and for 0.150 CRS and the required pressure would be about 2,400 Lbs. electrode force. A cylinder having a 1¾ inch bore would more than cover the entire range.

To substantiate the above statement, a typical design sample is shown as follows:-

Area of 1¾ inch bore cylinder or area of front piston is 2.42 sq. in.

Area of ⅝ inch piston rod is 0.306 sq. in.

Area of ¼ inch port is 0.049 sq. inch.

Area differential between 1¾ inch piston and ¼ inch port is 2.42/.049 = 49:1

The locking pressure of the cylinder would then be 49×2.42 = 118.58× pressure against locking piston.

This would be actual pressure if the separator chamber was not pressurized, however since it is, the area differential between the ⅝ inch locking piston rod and the 1¾ inch locking piston which is 2.42 sq. in./.306 sq. in. = 7.9:1, would have to be taken in consideration.

Assuming that the pressure in the separator is the same as in the locking port, the locking pressure would be no less than the area differential between the 1¾ inch piston and ¼ inch port times the area differential of 1¾ inch and ⅝ inch rod, less 1, divided by area differential of 1¾ inch piston and ⅝ inch rod times the area of the front piston,- i.e. $(2.42/.049) \times (7.9 - 1/7.9) \times 2.42 = \mathbf{103.07 : 1}$

This would be a minimum and would be dependent on actual contact area of the locking piston rod seal. Similarly, a maximum would be 118.58 : 1

Assuming that the average air pressure used in industry is 80 PSI, the minimum load this cylinder would support, would be 80×103.07 = 8,246 Lbs. or a maximum of 80×118.58 = 9,486 Lbs.

Referring to the variation in FIG. 2, and assuming that a 30 spring 20 is used, then the load it would support could be,-

$(80 \text{ PSI} - 30 \text{ PSI}) \times 103.7 = 5,185 \text{ Lbs.}$

Having described the invention what I claim is:

1. A high pressure source operated cylinder for attaching a back-up resistance welding electrode thereto, comprising a cylinder; a front piston and piston rod, within said cylinder; a rear locking piston and piston rod terminating in a sealing washer, within said cylinder; a fixed separator block between said pistons within which said locking piston rod slides; a chamber within the separator block provided with an intake port in its wall for the entry of pressurized hydraulic fluid for providing the pressure for the downward stroke of the front piston, and exit port centrally located in the base of said separator block, being opened and closed by said sealing washer, through which the said hydraulic fluid passes to the front piston until shut off by said sealing washer; a fixed guiding block within said cylinder in which slides the front piston rod; a compressed air intake port in the wall of the cylinder located between the front piston and said guiding block, to provide pressure to the front piston for its return stroke; a mounting base at the rear of the cylinder containing therein a compressed air intake port which supplies the pressure to the locking piston for its downward locking stroke; and a manifold attached to the outer wall of the cylinder for transferring the pressurized air contained between the front piston and the guiding block, to the underside of the locking piston for its return stroke.

2. A cylinder such as described in claim 1 in combination with a tank containing a hydraulic fluid under pressure, said tank being directly connected with the intake port of said separator block.

\* \* \* \* \*